US012795400B2

(12) United States Patent
Yuan et al.

(10) Patent No.: US 12,795,400 B2
(45) Date of Patent: Nov. 10, 2026

(54) TERMINAL PROTOCOL FUNCTION UPDATE METHOD AND APPARATUS

(71) Applicant: VIVO MOBILE COMMUNICATION CO., LTD., Guangdong (CN)

(72) Inventors: Yannan Yuan, Guangdong (CN); Zichao Ji, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 389 days.

(21) Appl. No.: 18/419,672

(22) Filed: Jan. 23, 2024

(65) Prior Publication Data

US 2024/0163692 A1 May 16, 2024

Related U.S. Application Data

(63) Continuation of application No. PCT/CN2022/106683, filed on Jul. 20, 2022.

(30) Foreign Application Priority Data

Jul. 23, 2021 (CN) ......................... 202110839421.3

(51) Int. Cl.

*H04W 24/02* (2009.01)
*H04W 8/22* (2009.01)
*H04W 76/20* (2018.01)
*H04W 80/02* (2009.01)

(52) U.S. Cl.

CPC ............. *H04W 24/02* (2013.01); *H04W 8/22* (2013.01); *H04W 76/20* (2018.02); *H04W 80/02* (2013.01)

(58) Field of Classification Search

CPC ....... H04W 24/02; H04W 8/22; H04W 76/20; H04W 80/02; H04W 8/24; H04W 8/245; H04W 4/50; H04L 67/34

See application file for complete search history.

(56) References Cited

U.S. PATENT DOCUMENTS

2016/0007250 A1* 1/2016 Pani ...................... H04L 1/1877 370/331
2018/0041922 A1 2/2018 Chen et al.
2018/0249513 A1 8/2018 Chang et al.
2018/0376414 A1 12/2018 Zeng et al.

(Continued)

FOREIGN PATENT DOCUMENTS

CN 101599854 A 12/2009
CN 101662466 A 3/2010

(Continued)

OTHER PUBLICATIONS

Extended European Search Report for Application No. 22845338.7, dated Sep. 26, 2024, 9 Pages.

(Continued)

*Primary Examiner* — Ashley Shivers

(74) *Attorney, Agent, or Firm* — Foley & Lardner LLP

(57) ABSTRACT

A terminal protocol function update method and apparatus. The terminal protocol function update method in embodiments of this application includes: receiving, by a terminal, protocol function configuration information of a first service configured by a network side device; and updating, by the terminal, a protocol function according to the protocol function configuration information.

16 Claims, 7 Drawing Sheets

(56) References Cited

U.S. PATENT DOCUMENTS

| | | | | |
|---|---|---|---|---|
| 2022/0295354 | A1 | 9/2022 | Kim et al. | |
| 2023/0345232 | A1* | 10/2023 | Sha | H04W 8/24 |

FOREIGN PATENT DOCUMENTS

| | | | |
|---|---|---|---|
| CN | 105992242 | A | 10/2016 |
| CN | 110572838 | A | 12/2019 |
| KR | 20210054974 | A | 5/2021 |
| WO | 2014177022 | A1 | 11/2014 |

OTHER PUBLICATIONS

International Search Report and Written Opinion for Application No. PCT /CN2022/106683, dated Oct. 10, 2022, 7 Pages.

* cited by examiner

| | | |
|---|---|---|
| Protocol SW Function Indication | Protocol SW Interface Indication | Oct 1 |
| Length of Protocol SW File | | Oct 2 |
| Length of Protocol SW File | | Oct 3 |
| Protocol SW File Indentifier | | |
| Protocol SW File | | |
| ... | | |
| Protocol SW File | | Oct N |

| Bits 8 7 6 5 4 3 2 1 | |
|---|---|
| 0 1 – – – – – – | 5GS mobility management message |
| 0 1 1 0 1 0 0 1 | Protocol software update request |
| 0 1 1 0 1 0 1 0 | Protocol software update accept |
| 0 1 1 0 1 0 1 1 | Protocol software update reject |

TERMINAL PROTOCOL FUNCTION UPDATE METHOD AND APPARATUS

CROSS-REFERENCE TO RELATED APPLICATIONS

This application is a continuation of International Application No. PCT/CN2022/106683 filed on Jul. 20, 2022, which claims priority to Chinese Patent Application No. 202110839421.3, filed on Jul. 23, 2021, which are incorporated herein by reference in their entireties.

TECHNICAL FIELD

This application belongs to the field of wireless communication technology, and specifically relates to a terminal protocol function update method and apparatus.

BACKGROUND

With the development of $6^{th}$ generation (6G) network research, the industry defines key 6G capability indicators from multiple dimensions such as peak rate, user experience rate, spectrum efficiency, traffic density, user plane delay, control plane delay, delay jitter, energy consumption, sensing precision, synchronization precision, intelligence level, and security capacity. The above key capability indicators are at least one order of magnitude higher than similar indicators in the $5^{th}$ generation (5G). At the same time, new capability indicators in more dimensions are also proposed. If the stacked development of complexity-for-performance continues, the complexity on the terminal side will increase significantly. Therefore, a low-complexity 6G terminal solution needs to be defined.

If the terminal hardware capabilities can support it, it is currently unable to support rapid updating of protocol functions not supported by the current terminal device or user terminal (UE) side through an air interface based on mobile communication protocol functions. Under the extremely differentiated requirements of 6G, the terminal side needs to support protocol functions for all potential service scenarios, which may lead to a significant increase in terminal complexity.

SUMMARY

According to a first aspect, a terminal protocol function update method is provided, including:

- receiving, by a terminal, protocol function configuration information of a first service configured by a network side device; and
- updating, by the terminal, a protocol function according to the protocol function configuration information.

According to a second aspect, a terminal protocol function update method is provided, including:

- sending, by a network side device, configured protocol function configuration information of a first service to a terminal.

According to a third aspect, a terminal protocol function update apparatus is provided, including:

- a first receiving module, configured to receive protocol function configuration information of a first service configured by a network side device; and
- an update module, configured to update a protocol function according to the protocol function configuration information.

According to a fourth aspect, a terminal protocol function update apparatus is provided, including:

- a first sending module, configured to send configured protocol function configuration information of a first service to a terminal.

According to a fifth aspect, a terminal is provided. The terminal includes a processor, a memory, and a program or an instruction that is stored in the memory and that can be run on the processor, where the program or the instruction is executed by the processor to implement the steps of the method in the first aspect.

According to a sixth aspect, a terminal is provided, including a processor and a communication interface, where the communication interface is configured to receive protocol function configuration information of a first service configured by a network side device; and the processor is configured to update a protocol function according to the protocol function configuration information.

According to a seventh aspect, a network side device is provided. The network side device includes a processor, a memory, and a program or an instruction that is stored in the memory and that can be run on the processor, where the program or the instruction is executed by the processor to implement the steps of the method in the second aspect.

According to an eighth aspect, a network side device is provided, including a processor and a communication interface, where the communication interface is configured to send configured protocol function configuration information of a first service to a terminal.

According to a ninth aspect, a readable storage medium is provided. The readable storage medium stores a program or an instruction, and when the program or the instruction is executed by a processor, the steps of the method in the first aspect or the steps of the method in the second aspect are implemented.

According to a tenth aspect, a chip is provided. The chip includes a processor and a communication interface, the communication interface is coupled to the processor, and the processor is configured to run a program or an instruction to implement the method in the first aspect or the method in the second aspect.

According to an eleventh aspect, a computer program product is provided, the computer program product is stored in a non-volatile storage medium, and the computer program product is executed by at least one processor to implement the steps of the method according to the first aspect or the computer program product is executed by at least one processor to implement the steps of the method according to the second aspect.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that, the terms used in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the description and the claims, "and/or" represents at least one of connected objects, and a character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. The following descriptions describe a new radio (NR) system for example purposes, and NR terms are used in most of the following descriptions, but these technologies can also be applied to an application other than an NR system application, for example, a 6$^{th}$ generation (6G) communications system.

Figure 1:
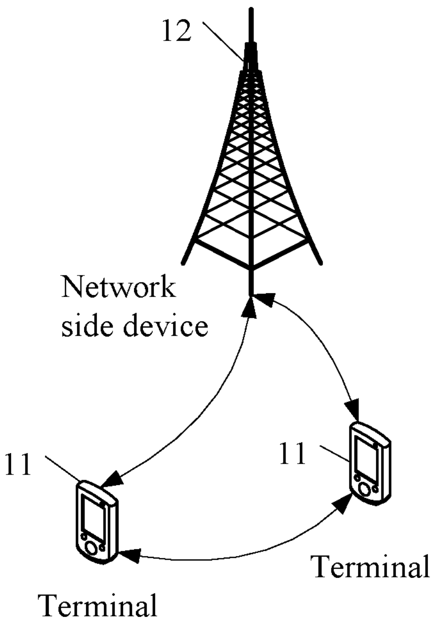
FIG. 1 is a block diagram of a wireless communications system to which an embodiment of this application is applicable.

FIG. 1 is a block diagram of a wireless communications system to which embodiments of this application can be applied. The wireless communications system includes a terminal 11 and a network side device 12. The terminal 11 may also be called a terminal device or user equipment (UE), and the terminal 11 may be a mobile phone, a tablet computer, a laptop computer (LC) or a notebook computer, a personal digital Assistant (PDA), a palmtop computer, a netbook, an ultra-mobile personal computer (UMPC), a mobile Internet device (MID), a wearable device or a vehicle-mounted device (VUE), a pedestrian terminal (PUE), and other terminal side devices. The wearable device includes: smart watches, bracelets, earphones, glasses, etc. It should be noted that a specific type of the terminal 11 is not limited in the embodiments of this application. The network side device 12 may be a base station or a core network. The base station may be referred to as a node B, an evolved node B, an access point, a base transceiver station (BTS), a radio base station, a radio transceiver, a basic service set (BSS), an extended service set (ESS), a node B, an evolved node B (eNB), a home node B, a home evolved node B, a wireless local area network (WLAN) access point, a wireless fidelity (WiFi) node, a transmitting receiving point (TRP), or other appropriate terms in the art. As long as a same technical effect is achieved, the base station is not limited to a specified technical term. It should be noted that, in embodiments of this application, only a base station in the NR system is used as an example, but a specific type of the base station is not limited.

The technical terms related to this application are introduced below.

1) Digital Twin

Digital twin is a simulation process that makes full use of data such as physical models, sensor updates, and operation history and integrates multi-disciplinary, multi-physical quantities, multi-scale, and multi-probability to complete mapping in virtual space to reflect the full life cycle of the corresponding physical equipment. Digital twin was initially proposed to digitize fighter aircraft maintenance work, and was later applied in fields such as industrial manufacturing and smart cities. With the emergence of new mobile network services and the continuous expansion of network scale, network operation and maintenance are becoming more complex, and the implementation and deployment of innovative technologies are difficult. Therefore, digital twins are considered to be one of the important directions of 6G networks, providing full life cycle smart operation and maintenance and smart autonomy for mobile networks.

2) Complexity and Power Consumption

As seen from the development history from the 2nd generation (2G), the 3rd generation (3G), and the 4$^{th}$ generation (4G) to 5G, as the network scale continues to expand and the complexity increases, the network architecture becomes complex and redundant. According to existing network development trends, the complexity of the 6G network supporting the Internet of Everything will increase exponentially. At present, the industry generally estimates that the computing complexity of 5G will be 10 to 20 times higher than that of 4G modems. If this direction continues, the complexity of 6G will be at least one order of magnitude higher than that of 5G. Therefore, 6G terminals will definitely adopt low-complexity design solutions.

The battery capacity of mobile phones continues to increase. Currently, the common battery capacity is 4500 mAh, but the battery life is the same as that of 4G mobile phones, or even shorter. According to test data from relevant institutions, due to the increased number of transmitting and receiving antennas in mobile phones, the increased complexity of baseband processing and the deployment coverage of 5G networks, the current power consumption of 5G mobile phones is approximately 20% higher than that of 4G mobile phones.

Several scenarios involved in this application are introduced below.

When the digital twin network involves terminals, the protocol functions of the terminal need to be customized for modem-related digital twin services. It is difficult for existing terminals to support digital twin services related to UE modem, and therefore it is necessary to solve the digital twin problem at the UE modem level.

For example: an operator develops enterprise standards based on the 3rd Generation Partner Project (3GPP) Rx (such as R16) standard. The network equipment and mobile terminals in the operator's commercial network all follow the enterprise standards. On the basis of commercial networks, the operator provides digital twin network services to themselves, Internet application (APP) manufacturers, equipment vendors, terminal manufacturers, etc. When the digital twin network services provide digital twin domain verification for potential commercial new technologies, it is usually necessary to incrementally add new functional features based on existing enterprise standard functions. The newly added functional features may be standard-defined functions, or may be lightweight customized (non-standard) small functions based on the standard-defined functions. Specific example scenarios are as follows.

When operators provide digital twin networks as a new service to terminal manufacturers and equipment vendors, specific scenarios include at least the following: terminal companies solve and verify modem functions, equipment vendors provide new functions based on a certain protocol version, and operators launch new functions according to service needs.

Scenario 1: The operator's network operation and maintenance optimization department is conducting network optimization research and development, and this requires the usage of newly defined functions (for example, positioning enhancement) of Ry (such as R17). In this case, the performance of the solution needs to be verified during the development process of this new technology and iterative optimization is performed. In addition, equipment manufacturers may also need to use newly defined functions (such as some functions of NR-light in industrial scenarios) of Ry (such as R17) when developing new network technologies. Therefore, for mobile terminals described in the example that comply with enterprise standards based on Rx (such as R16), the above functional updates cannot be realized through existing signaling or network management configuration. When the digital twin service provided by the operator is used for end-to-end new technology verification in the research and development of the above new technologies, the protocol software function on the UE side of the digital twin needs to be updated. A potential time-division multiplexed digital twin solution is based on user authorization, and the protocol software functions of the digital twin user are sent to the user through the air interface in the early morning hours, and are installed and used. After the digital twin is completed, the protocol software used by the UE in the commercial network is restored. If supported by the UE side hardware, the above protocol software that needs to be installed and used on the UE side may come from operators, equipment vendors, etc., and is not limited to chip vendors or terminal vendors. Moreover, the verification of the above new technologies usually requires equivalent support from network side equipment and even application layer functions. Therefore, the update process requires the network side to uniformly control the above process and instruct the UE side to complete the protocol software update.

Scenario 2: When modems of a terminal company are added with new functions (for example, newly defined non-access stratum (NAS) messages) or communication performance is optimized, network equipment is required to cooperate with the verification during the research and development process. Autonomously building a verification environment often involves high manpower investment and high equipment costs. It is also difficult to achieve network equipment docking verification for all equipment providers in the operator's network, and it is difficult to traverse different network coverage and networking conditions in commercial networks. Based on the above digital twin services, new technology verification of a terminal company can be supported, but digital twin UE needs to be implemented by downloading and installing the protocol software function in a case of UE side hardware support and user authorization. Therefore, the network side needs to uniformly control the above process, instruct the UE side to complete the protocol software update, and configure the digital twin UE. Online upgrade of the above terminal-side protocol functions is also very necessary for industry terminals in industry network scenarios. Due to the limitations of deployment and installation in the industry environment, industry terminals usually have a longer service life than ordinary user terminals. Therefore, during usage, it is necessary perform online upgrade on terminal-side protocol software for new functions.

Scenario 3: The new features used in scenario 1 above may also be potential Rz (such as R18) technologies, and are unstandardized features from the current perspective. Alternatively, the new features may be lightweight functions customized by the operator or equipment manufacturer based on the above (R16) enterprise standard. Therefore, the above function cannot be realized through existing signaling or network management configuration. Similar to scenario 1, the UE side software function needs to be updated for verification. Further, for the 6G network, a potential solution is based on the standard-defined physical layer or based on the standard-defined physical layer and some Media Access Control 0 technologies, and (a part of) MAC and above functions support different service needs by downloading and updating protocol software based on air interface interaction. Under this technical solution, the network and the terminal need to interact with each other to download and update protocol software.

The terminal protocol function update method and apparatus provided by the embodiments of this application will be described in detail below through some embodiments and application scenarios with reference to the accompanying drawings.

Figure 2:
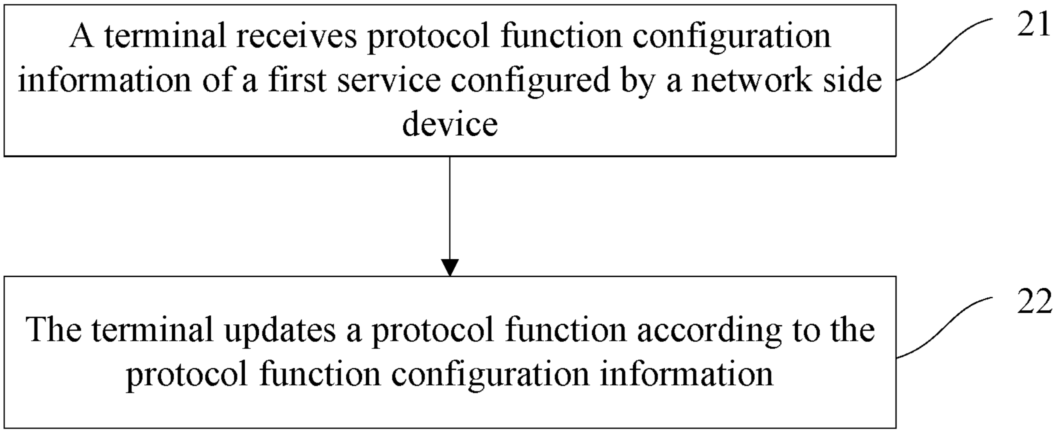
FIG. 2 is a schematic flowchart of a terminal protocol function update method executed by a terminal according to an embodiment of the present application.

Refer to FIG. 2. This embodiment of this application provides a terminal protocol function update method, which includes:

Step 21: A terminal receives protocol function configuration information of a first service configured by a network side device.

In this embodiment of this application, the network side device may be a core network device or an access network device.

In this embodiment of this application, optionally, the first service may include at least one of the following: a digital twin service, a service requiring support by a new protocol function, etc.

Step 22: The terminal updates a protocol function according to the protocol function configuration information.

In the embodiments of this application, the network side device configures the protocol function configuration information of the first service and sends the information to the terminal, that is, the protocol function required on the UE side is dynamically updated for a certain service scenario through the air interface based on the mobile communication protocol function, so that the terminal side does not need to support the protocol function for all potential service scenarios, reducing the complexity of the terminal.

In this embodiment of this application, optionally, the protocol function configuration information includes at least one of the following:

physical layer protocol function configuration information;

radio access network high-layer protocol function, where the radio access network high-layer protocol function may include: a radio access network high-layer user plane protocol function and a radio access network high-layer control plane protocol function, and specifically may include at least one of the following: a MAC protocol function, a radio link control (RLC) protocol function, a packet data convergence protocol (PDCP) protocol function, and a service data adaption protocol (SDAP) protocol function;

non-access stratum (NAS) protocol function configuration information; and application layer protocol function configuration information.

In this embodiment of this application, optionally, the protocol function configuration information is carried by at least one of the following messages:

a media access control control element (MAC CE);

a radio resource control (RRC) message;

a NAS message;

a management and orchestration message; and user plane data, where the user plane data may be at least one of a logical channel, a data radio bearer (DRB), and a protocol data unit (PDU) session.

In this embodiment of this application, optionally, the protocol function configuration information is carried by one or more messages.

In the embodiments of this application, optionally, after the terminal receives the protocol function configuration information of the first service configured by the network side device, the method further includes: in a case that the protocol function configuration information is carried by an RRC message or a NAS message, and the received protocol function configuration information includes multiple segments, regrouping, by the terminal, the multiple segments.

In the embodiments of this application, optionally, before the terminal receives the protocol function configuration information of the first service configured by the network side device, the method further includes: sending, by the terminal, a first protocol function update request to the network side device, where the first protocol function update request is used to request the protocol function configuration information of the first service from the network side device. That is, the terminal actively triggers update of the protocol function configuration information of the first service.

In this embodiment of this application, optionally, the first protocol function update request includes at least one of the following:

1) a protocol function range supported by the terminal, where the protocol function range includes at least one of the following: a physical layer protocol function, a high-layer user plane protocol function, a high-layer control plane protocol function, a NAS protocol function, and an application layer protocol function.

2) information of a target service supported by the protocol function configuration information requested by the terminal, where the information of the target services includes at least one of the following: a service type and a service time.

The service type may be a major service type or a service subtype based on standards, or an identifier for a specific service, so that the network can configure protocol functions according to UE service conditions.

The service time may include at least one of the following: a start time and a time interval.

3) suggestion or requirement of the terminal for protocol function configuration, where the suggestion or the requirement includes at least one of the following:

31) physical layer protocol function configuration suggestion or requirement.

Examples are a physical layer protocol function configuration suggestion or requirement for 5G or 5G evolution, and a newly defined physical layer protocol function configuration suggestion or requirement for 6G (supporting large-bandwidth communication and/or sensing).

32) radio access network high-layer protocol function suggestion or requirement.

The radio access network high-layer protocol function suggestion or requirement may include at least one of the following:

321) radio access network high-layer user plane protocol function suggestion or requirement.

The radio access network high-layer user plane protocol function suggestion or requirement may include at least one of the following:

functions related to service requirements and unrelated to variable air interface features, for example, including at least one of the following: header compression, encryption and decryption, integrity protection, and user plane mapping for Quality of Service (QoS); and functions related to variable air interface features, for example, including at least one of the following: unpacking/packaging, and multiplexing/demultiplexing.

322) radio access network high-layer control plane protocol function suggestion or requirement.

The radio access network high-layer control plane protocol function suggestion or requirement may include at least one of the following:

functions related to service requirements and unrelated to variable air interface features, for example, including at least one of the following: header compression, encryption and decryption, integrity protection, and QoS management; and functions related to variable air interface features, for example, including at least one of the following: radio resource management, mobility management, connection management, and user plane management.

33) NAS protocol function suggestion or requirement.

NAS protocol function suggestion or requirement may include at least one of the following:

functions related to service needs, such as authentication and other security mechanisms; and functions related to network processing, such as non-access layer termination (NAS termination) configuration and/or NAS termination configuration based on a service type.

34) application layer protocol function suggestion or requirement.

The application layer protocol function suggestion or requirement may include at least one of the following:

new application layer functions, such as newly defined applications by 3GPP; and existing application function update, such as IP multimedia subsystem (IMS) update.

In the embodiments of this application, optionally, before the terminal receives the protocol function configuration information of the first service configured by the network side device, the method further includes: sending, by the terminal, terminal capability reporting information to the network side device, where the terminal capability reporting information includes a protocol function range supported by the terminal for update by the network side device or includes that the terminal does not support protocol function update by the network side device, and the protocol function range includes at least one of the following: a physical layer protocol function, a high-layer user plane protocol function, a high-layer control plane protocol function, a NAS protocol function, and an application layer protocol function. That is, the terminal capability reporting information is expanded, to carry a protocol function range supported by the terminal for update by the network side device or carry that the terminal does not support protocol function update by the network side device. That is, the protocol function range supported by the terminal can be reported through the first protocol function update request, and can be reported in the terminal capability reporting information.

In the embodiment of this application, optionally, before the terminal receives the protocol function configuration information of the first service configured by the network side device, the method also includes:

receiving, by the terminal, a second protocol function update request sent by the network side device, where the second protocol function update request is used to request the terminal to update the protocol function configuration information of the first service; and sending, by the terminal, a protocol function update reception confirmation message or a protocol function update reception rejection message to the network side device.

In this embodiment, the network side device actively triggers update of the protocol function configuration information of the first service.

In the embodiment of this application, optionally, the protocol function configuration information is one of the following:

1) a complete protocol function file.

Optionally, the complete protocol function file includes: a protocol function description and a protocol function file, and the protocol function description includes at least one of the following: a protocol function indication, a protocol interface indication, an updated protocol function file length indication, and a protocol function identifier.

2) a partial protocol function file.

Optionally, the partial protocol function file includes: a protocol function description and a protocol function file, and the protocol function description includes at least one of the following: a reference template or a reference function of the protocol function, a protocol function indication, a protocol interface indication, an updated protocol function file length indication, and a protocol function identifier.

3) an incremental protocol function file based on a historically downloaded protocol function.

Optionally, the incremental protocol function file based on a historically downloaded protocol function includes: a protocol function description and a protocol function file, and the protocol function description includes at least one of the following: a reference template or a reference function of the protocol function, insertion position information of the incremental protocol function, an updated protocol function file length indication, and a protocol function identifier.

In this embodiment of this application, optionally, after the terminal updates the protocol function according to the protocol function configuration information, the method further includes: sending, by the terminal, a protocol function update completion message to the network side device.

In this embodiment of this application, optionally, after the terminal updates the protocol function according to the protocol function configuration information, the method further includes: in a case that the terminal only supports the updated protocol function, deleting, by the terminal, an old protocol function according to a deletion instruction sent by the network side device.

In this embodiment of this application, optionally, after the terminal updates the protocol function according to the protocol function configuration information, the method further includes: in a case that the terminal supports both the updated protocol function and the old protocol function, receiving, by the terminal, a usage rule configuration of the updated protocol function sent by the network side device.

In the embodiment of this application, optionally, after the terminal updates the protocol function according to the protocol function configuration information, the method further includes:

in a case that the terminal fails in updating the protocol function, performing at least one of the following:

sending a protocol function update failure message to the network side device; and removing the updated protocol function.

In the embodiment of this application, optionally, after the terminal updates the protocol function according to the protocol function configuration information, the method further includes: sending, by the terminal, information of the first service based on the updated protocol function.

In this embodiment of this application, optionally, content of the protocol function update includes at least one of the following: functional function update, software update, virtual machine update, container update, and microservice application update.

In this embodiment of this application, optionally, the protocol function configuration of the first service configured for the terminal is defined by hardware capabilities of the terminal, and terminals with different hardware capabilities correspond to different protocol function configurations.

Figure 3:
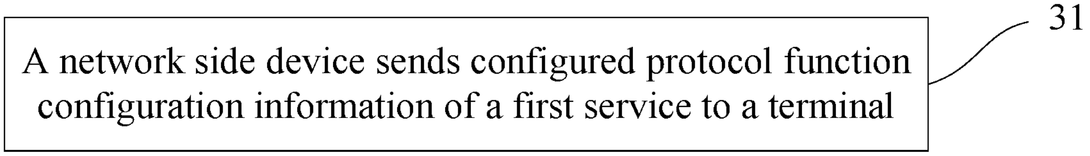
FIG. 3 is a schematic flowchart of a terminal protocol function update method executed by a network side device according to an embodiment of this application.

Refer to FIG. 3. This embodiment of this application also provides a terminal protocol function update method, including:

Step 31: A network side device sends configured protocol function configuration information of a first service to a terminal.

In this embodiment of this application, the network side device may be a core network device or an access network device.

In this embodiment of this application, optionally, the first service may include at least one of the following: a digital twin service, a service requiring support by a new protocol function, etc.

In the embodiments of this application, the network side device configures the protocol function configuration information of the first service and sends the information to the terminal, that is, the protocol function required on the UE side is dynamically updated for a certain service scenario through the air interface based on the mobile communication protocol function, so that the terminal side does not need to support the protocol function for all potential service scenarios, reducing the complexity of the terminal.

In this embodiment of this application, optionally, the protocol function configuration information includes at least one of the following:

physical layer protocol function configuration information;

radio access network high-layer protocol function, where the radio access network high-layer protocol function may include: a radio access network high-layer user plane protocol function and a radio access network high-layer control plane protocol function, and specifically may include at least one of the following: a MAC protocol function, an RLC protocol function, a PDCP protocol function, and an SDAP protocol function;

NAS protocol function configuration information; and application layer protocol function configuration information.

In this embodiment of this application, optionally, the protocol function configuration information is sent through at least one of the following messages:

a MAC CE;

an RRC message;

a NAS message;

a management and orchestration message; and user plane data.

In this embodiment of this application, optionally, the network side device sends the configured protocol function configuration information of the first service to the terminal through one or more messages.

In the embodiment of this application, optionally, before the network side device sends the configured protocol function configuration information of the first service to the terminal, the method further includes: in a case that the protocol function configuration information is sent through an RRC message or a NAS message, and a length of the protocol function configuration information exceeds a preset threshold, dividing the protocol function configuration information into multiple segments.

In this embodiment of this application, optionally, before the network side device sends the configured protocol function configuration information of the first service to the terminal, the method further includes: receiving, by the network side device, a first protocol function update request sent by the terminal, where the first protocol function update request is used to request the protocol function configuration information of the first service from the network side device.

In this embodiment of this application, the network side device may also reject the first protocol function update request sent by the terminal, and send a rejection message to the terminal.

In this embodiment of this application, optionally, the first protocol function update request includes at least one of the following:

1) a protocol function range supported by the terminal, where the protocol function range includes at least one of the following: a physical layer protocol function, a high-layer user plane protocol function, a high-layer control plane protocol function, a NAS protocol function, and an application layer protocol function.

2) information of a target service supported by the protocol function configuration information requested by the terminal, where the information of the target services includes at least one of the following: a service type and a service time.

The service type may be a major service type or a service subtype based on standards, or an identifier for a specific service, so that the network can configure protocol functions according to UE service conditions.

The service time may include at least one of the following: a start time and a time interval.

3) suggestion or requirement of the terminal for protocol function configuration, where the suggestion or the requirement includes at least one of the following:

31) physical layer protocol function configuration suggestion or requirement.

Examples are a physical layer protocol function configuration suggestion or requirement for 5G or 5G evolution, and a newly defined physical layer protocol function configuration suggestion or requirement for 6G (supporting large-bandwidth communication and/or sensing).

32) radio access network high-layer protocol function suggestion or requirement.

The radio access network high-layer protocol function suggestion or requirement may include at least one of the following:

321) radio access network high-layer user plane protocol function suggestion or requirement.

The radio access network high-layer user plane protocol function suggestion or requirement may include at least one of the following:

functions related to service requirements and unrelated to variable air interface features, for example, including at least one of the following: header compression, encryption and decryption, integrity protection, and user plane mapping for QoS; and functions related to variable air interface features, for example, including at least one of the following: unpacking/packaging, and multiplexing/demultiplexing.

322) radio access network high-layer control plane protocol function suggestion or requirement.

The radio access network high-layer control plane protocol function suggestion or requirement may include at least one of the following:

functions related to service requirements and unrelated to variable air interface features, for example, including at least one of the following: header compression, encryption and decryption, integrity protection, and QoS management; and functions related to variable air interface features, for example, including at least one of the following: radio resource management, mobility management, connection management, and user plane management.

33) NAS protocol function suggestion or requirement.

NAS protocol function suggestion or requirement may include at least one of the following:

functions related to service needs, such as authentication and other security mechanisms; and functions related to network processing, such as non-access layer termination (NAS termination) configuration and/or NAS termination configuration based on a service type.

34) application layer protocol function suggestion or requirement.

The application layer protocol function suggestion or requirement may include at least one of the following:

new application layer functions, such as newly defined applications by 3GPP; and existing application function update, such as IMS update.

In the embodiment of this application, optionally, before the network side device sends the configured protocol function configuration information of the first service to the terminal, the method further includes:

receiving, by the network side device, terminal capability reporting information sent by the terminal, where the terminal capability reporting information includes a protocol function range supported by the terminal for update by the network side device or includes that the terminal does not support protocol function update by the network side device, and the protocol function range includes at least one of the following: a physical layer protocol function, a high-layer user plane protocol function, a high-layer control plane protocol function, a NAS protocol function, and an application layer protocol function, that is, the protocol function range supported by the terminal can be reported through the first protocol function update request, and may be reported in the terminal capability reporting information.

The network side device configures the protocol function configuration information according to the terminal capability reporting information.

In the embodiment of this application, optionally, before the network side device sends the configured protocol function configuration information of the first service to the terminal, the method further includes:

The network side device sends a second protocol function update request to the terminal, where the second protocol function update request is used to request the terminal to update the protocol function configuration information of the first service.

receiving, by the network side device, a protocol function update reception confirmation message sent by the terminal.

In this embodiment of this application, optionally, the second protocol function update request includes at least one of the following:

a configured protocol function range, where the protocol function range includes at least one of the following: a physical layer protocol function, a high-layer user plane protocol function, a high-layer control plane protocol function, a NAS protocol function, and an application layer protocol function; and information of a target service supported by the protocol function configuration information, where the information of the target services includes at least one of the following: a service type and a service time.

In this embodiment of this application, optionally, the second protocol function update request may be sent in the same message as the protocol function configuration information of the first service, or may be sent in a different message.

In the embodiment of this application, optionally, the protocol function configuration information is one of the following:

1) a complete protocol function file.

Optionally, the complete protocol function file includes: a protocol function description and a protocol function file, and the protocol function description includes at least one of the following: a protocol function indication, a protocol interface indication, an updated protocol function file length indication, and a protocol function identifier.

2) a partial protocol function file.

Optionally, the partial protocol function file includes: a protocol function description and a protocol function file, and the protocol function description includes at least one of the following: a reference template or a reference function of the protocol function, a protocol function indication, a protocol interface indication, an updated protocol function file length indication, and a protocol function identifier.

3) an incremental protocol function file based on a historically downloaded protocol function.

Optionally, the incremental protocol function file based on a historically downloaded protocol function includes: a protocol function description and a protocol function file, and the protocol function description includes at least one of the following: a reference template or a reference function of the protocol function, insertion position information of the incremental protocol function, an updated protocol function file length indication, and a protocol function identifier.

In this embodiment of this application, optionally, after the sending, by a network side device, configured protocol function configuration information of a first service to a terminal, the method further includes: receiving, by the network side device, a protocol function update completion message or protocol function update failure message sent by the terminal.

In the embodiment of this application, optionally, after the network side device sends the configured protocol function configuration information of the first service to the terminal, the method also includes: in a case that the terminal supports both the updated protocol function and the old protocol function, sending, by the network side device, a usage rule configuration of the updated protocol function to the terminal. For example, RRC reconfiguration may be used to send the usage rule configuration of the updated protocol function to the UE.

In this embodiment of this application, optionally, after the sending, by a network side device, configured protocol function configuration information of a first service to a terminal, the method further includes: receiving, by the network side device, information of the first service sent by the terminal based on the updated protocol function.

In the embodiment of this application, optionally, the method further includes: verifying, by the network side device, the protocol function updated by the terminal. If there is a problem, the network side needs to deal with the problem found during the verification.

In this embodiment of this application, optionally, content of the protocol function update includes at least one of the following: functional function update, software update, virtual machine update, container update, and microservice application update.

The following is an example of the terminal protocol function update method of this application based on specific usage scenarios.

Embodiment 1 of the Present Invention: MAC CE-Based Terminal Protocol Function Update Method This terminal protocol function update method includes:

Step 1: The base station sends a protocol function software update request of the first service to the terminal through a MAC CE (that is, the second protocol function update request described in the above embodiment). The protocol function software update request includes at least one of the following: a configured protocol function range, where the protocol function range includes at least one of the following: a physical layer protocol function, a high-layer user plane protocol function, a high-layer control plane protocol function, a NAS protocol function and an application layer protocol function.

Optionally, the MAC CE may also include: a service type of the requested protocol function software and protocol function software requested to be updated (that is, protocol function software configuration information of the first service).

That is, in the embodiment of this application, the protocol function software update request and the protocol function software configuration information can be sent in the same message. Certainly, the protocol function software update request and the protocol function software configuration information can also be sent separately. For example, the protocol function software update request is sent through the MAC CE, and the protocol function software is sent through the user plane. That is, the protocol function software can be sent through both the MAC CE and the user plane.

In the embodiment of this application, a protocol function software update media access control control element (protocol software update MAC CE) can be added, and the MAC CE is included through expanded definition based on an extended logical channel identifier (eLCID).

In the embodiment of this application, optionally, the protocol function configuration information is one of the following:

1) a complete protocol function file.

Optionally, the complete protocol function file includes: a protocol function description and a protocol function file, and the protocol function description includes at least one of the following: a protocol function indication, a protocol interface indication, an updated protocol function file length indication, and a protocol function identifier.

Figures 4, 5:
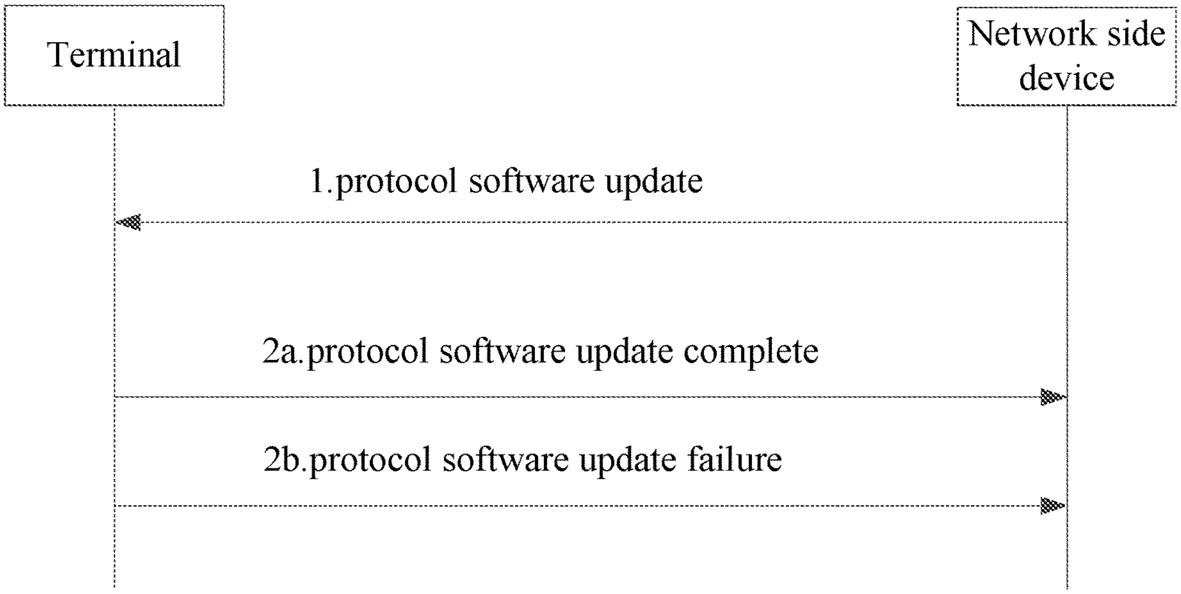
FIG. 4 is a schematic diagram of protocol function description of baseband processing function software on the UE side according to an embodiment of this application.
FIG. 5 is a schematic flowchart of a terminal protocol function update method according to Embodiment 1 of this application.

The complete protocol function file is, for example, complete UE-side baseband processing function software. As shown in FIG. 4. FIG. 4 is a schematic diagram of a protocol function description of UE-side baseband processing function software according to an embodiment of this application. When the Protocol SW Function Indication is entirely 1, it represents the complete UE-side baseband processing function software. When Protocol SW Interface Indication is 001, it represents a next generation application protocol (NGAP) interface. When the Length Of Protocol SW File is 0000 1111 1111 1111, it means that the length of the protocol function file is 4095 bytes. The protocol function identifier is used to identify the protocol function, and the subsequent fields are the protocol function file.

2) a partial protocol function file.

Optionally, the partial protocol function file includes: a protocol function description and a protocol function file, and the protocol function description includes at least one of the following: a reference template or a reference function of the protocol function, a protocol function indication, a protocol interface indication, an updated protocol function file length indication, and a protocol function identifier.

The partial protocol function file means that not protocol function configuration information of each layer needs to be included, and only protocol function configuration information of some layers can be updated, such as the PDCP layer.

The partial protocol function file is, for example, updating to add header compression function software of new PDCP definition. Therefore, the related message content includes a protocol function description and a protocol function file, where the protocol function description includes a reference template/function of the protocol function (for example, it can be R16-PDCP), a protocol function indication, a protocol interface indication, a protocol software length indication and/or a protocol function identifier, etc.

3) an incremental protocol function file based on a historically downloaded protocol function.

Optionally, the incremental protocol function file based on a historically downloaded protocol function includes: a protocol function description and a protocol function file, and the protocol function description includes at least one of the following: a reference template or a reference function (for example, a historically downloaded protocol software function whose protocol software identifier is xx) of the protocol function, insertion position information (for example, a position of the $1000^{th}$ byte) of the incremental protocol function, an updated protocol function file length indication, and a protocol function identifier.

The above protocol function identifier can also be used as a reference template or a reference function of the protocol function, so that it can be incrementally updated based on the version represented by the identifier.

The above step 1 can be completed by one or more messages. A feasible solution is that the base station only sends the protocol function description through the MAC CE, such as the protocol function indication, the protocol interface indication, the file length indication of the updated protocol function and/or the protocol function identifier. The protocol function file is sent through the user plane. In this case, a dedicated logical channel needs to be defined so that the UE side can identify it from the MAC PDU and install update. This solution is more suitable for downloading large protocol function software.

Step 2: The terminal updates the protocol function software according to the protocol function configuration information.

If the protocol function software update is completed, the UE sends an update completion message to the base station. If the update is completed and the UE only supports the updated protocol function software, the UE deletes the old protocol function software. If the update is successful and the UE can support multiple protocol function software, the network side can send the usage rule configuration of the successfully updated protocol function to the UE through RRC reconfiguration.

If update of the protocol function software fails, the terminal sends an update failure message to the network side device and deletes the updated protocol function software.

Embodiment 2 of the Present Invention: Terminal Protocol Function Update Method Based on an RRC Message Refer to FIG. 5. This terminal protocol function update method includes:

Step 1: the network device sends a protocol function software update request (protocol software update) of the first service to the terminal through RRC signaling (that is, the second protocol function update request described in the above embodiment). The protocol function software update request includes at least one of the following: a configured protocol function range, where the protocol function range includes at least one of the following: a physical layer protocol function, a high-layer user plane protocol function, a high-layer control plane protocol function, a NAS protocol function and an application layer protocol function.

Optionally, the MAC CE may also include: a service type of the requested protocol function software and protocol function software requested to be updated (that is, protocol function software configuration information of the first service).

For details of the protocol function configuration information, refer to Embodiment 1, and the description will not be repeated.

The above step 1 can be completed by one or more messages. A feasible solution is that the base station only sends the protocol function description through the RRC signaling, such as the protocol function indication, the protocol interface indication, the file length indication of the updated protocol function and/or the protocol function identifier. The protocol function file is sent through a DRB. In this case, it is necessary to indicate in the PDCP PDU header that the user plane data packet is a protocol function software file, so that the UE side can identify it from the PDCP PDU and install update. This solution is more suitable for downloading large protocol function software.

Step 2: The terminal updates the protocol function software according to the protocol function configuration information.

2*a*: If the protocol function software update is completed, the UE sends an RRC update completion message, that is, protocol software update complete, to the base station. If the update is completed and the UE only supports the updated protocol function software, the UE deletes the old protocol function software. If the update is successful and the UE can support multiple protocol function software, the network side can send the usage rule configuration of the successfully updated protocol function to the UE through RRC reconfiguration.

2*b*: If update of the protocol function software fails, the terminal sends an update failure message, that is, protocol software update failure, to the network side device and deletes the updated protocol function software.

Figure 6:
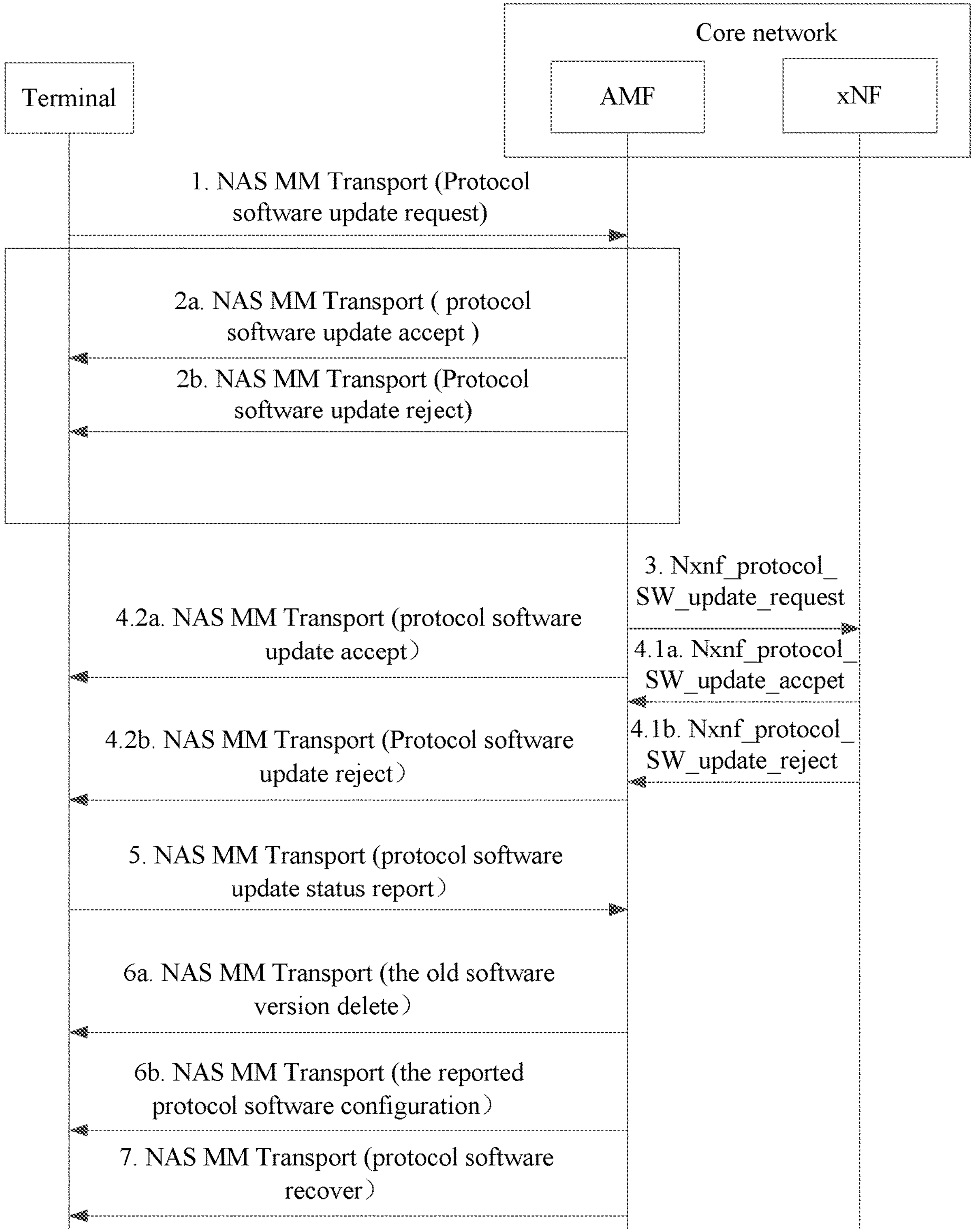
FIG. 6 is a schematic flowchart of a terminal protocol function update method according to Embodiment 2 of this application.

Embodiment 3 of the Present Invention: Terminal-Triggered Terminal Protocol Function Software Update Solution Based on a NAS Message Refer to FIG. 6. This terminal protocol function update method includes:

Step 1: UE sends a protocol function software update request of the first service, that is, NAS MM Transport (protocol software update), that is, the first protocol function update request described in the above embodiment. The protocol function software update request includes at least one of the following: a configured protocol function range, where the protocol function range includes at least one of the following: a physical layer protocol function, a high-layer user plane protocol function, a high-layer control plane protocol function, a NAS protocol function and an application layer protocol function.

In the embodiment of this application, the configured protocol function range can be defined as a protocol type information unit. One potential implementation solution is to use 5 bits to represent it (which can support 31 potential protocol functions).

Optionally, the protocol function software update request also includes: a service type of requested protocol function software and a suggestion or a requirement of the protocol function software requested to be updated.

Step 2: If the access and mobility management function (AMF) supports protocol function software update, the AMF analyzes whether there is available protocol function software based on a request message and/or UE context information and/or UE subscription information, etc.

Step 2*a*: If there is available protocol software, the AMF sends a protocol software function update acceptance message to the UE. For the transmission method of protocol function software, one method is to deliver the software through NAS information. In this case, it should be noted that because the NAS message has a maximum length limit (for example, NR is 9000 bytes), if the protocol software is larger than the maximum length of the NAS message, segmentation and regrouping need to be supported. The other method is to send the software through the user plane. In this case, the service identifier needs to be provided (for example, similar to protocol software update service defined in IMS), so that the baseband processing unit on the UE side can identify and use it. The protocol function software update is the same as that in Embodiment 1.

Step 2*b*: If there is no possible protocol software, send a protocol software function update rejection message to the UE.

Step 3: If the protocol function update is supported by other network functions of the core network, where xNF is used as an example in the figure, the AMF needs to support transparent transmission of the message, and xNF analyzes whether there is available protocol function software based on a request message and/or UE context information and/or UE subscription information, etc.

Step 4.1*a*: If xNF has available protocol function software, perform the same process as step 2*a*.

Step 4.1*b*: If not, xNF sends a protocol software function update rejection message to the UE.

Step 5: Optionally, the UE reports a protocol software update status.

Step 6*a*: Optionally, if the update is successful and the UE can only support the requested protocol function, the network sends an old protocol function software deletion message to the UE; and only after receiving the message, the UE deletes the old protocol software.

Step 6*b*: Optionally, if the update is successful and the UE can support the updated protocol function and the old protocol function software, the network sends an operation rule of the successfully updated protocol function software to the UE, such as eSIM to which it belongs to.

Step 7: Optionally, if the update fails, the network sends a recovery message to the UE, and the UE deletes the received protocol function software and continues to use the old protocol function software before the update.

Figures 7, 8:
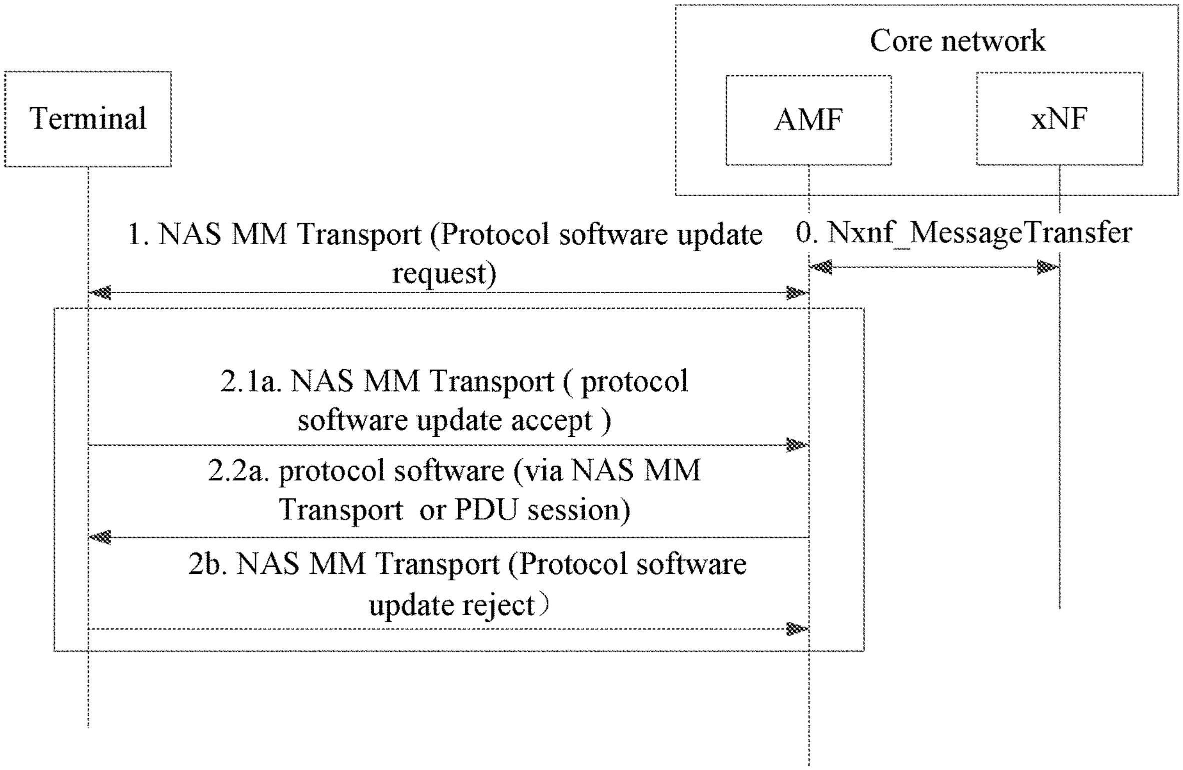
FIG. 7 is a schematic diagram of adding a protocol function update request and acceptance and rejection messages to a 5GS mobility management message according to an embodiment of this application.
FIG. 8 is a schematic flowchart of a terminal protocol function update method according to Embodiment 3 of this application.

Refer to FIG. 7. In the embodiment of this application, optionally, the protocol function update request, and acceptance and rejection messages can be added to the 5GS mobility management message.

Embodiment 4 of the Present Invention: a Network-Triggered Terminal Protocol Function Software Update Solution Based on a NAS Message Refer to FIG. 8. This terminal protocol function update method includes:

Step 1: The network side device sends a protocol function software update request of the first service, that is, NAS MM transport (protocol software update), that is, the second protocol function update request described in the above embodiment. The protocol function software update request includes at least one of the following: a configured protocol function range, where the protocol function range includes at least one of the following: a physical layer protocol function, a high-layer user plane protocol function, a high-layer control plane protocol function, a NAS protocol function and an application layer protocol function.

In the embodiment of this application, the configured protocol function range can be defined as a protocol type information unit. One potential implementation solution is to use 5 bits to represent it (which can support 31 potential protocol functions).

Optionally, the protocol function software update request also includes: a service type of requested protocol function software and a suggestion or a requirement of the protocol function software requested to be updated.

Steps 2.1*a* to 2.2*a*: If the UE can support the protocol function software update based on information analysis such as its hardware equipment and resources, the UE sends a reception message to the network. The protocol software is transmitted in the same manner as step 2*a* in Embodiment 3.

Step 2*b*: If the UE does not support the protocol function software update, the UE sends a rejection message to the network.

It should be noted that, the terminal protocol function update method provided by the embodiment of this application may be performed by a terminal protocol function update apparatus, or a control module in the terminal protocol function update apparatus configured to execute the terminal protocol function update method. In the embodiment of this application, the terminal protocol function update apparatus performing the terminal protocol function update method is taken as an example to illustrate the terminal protocol function update apparatus provided by the embodiment of this application.

Figure 9:
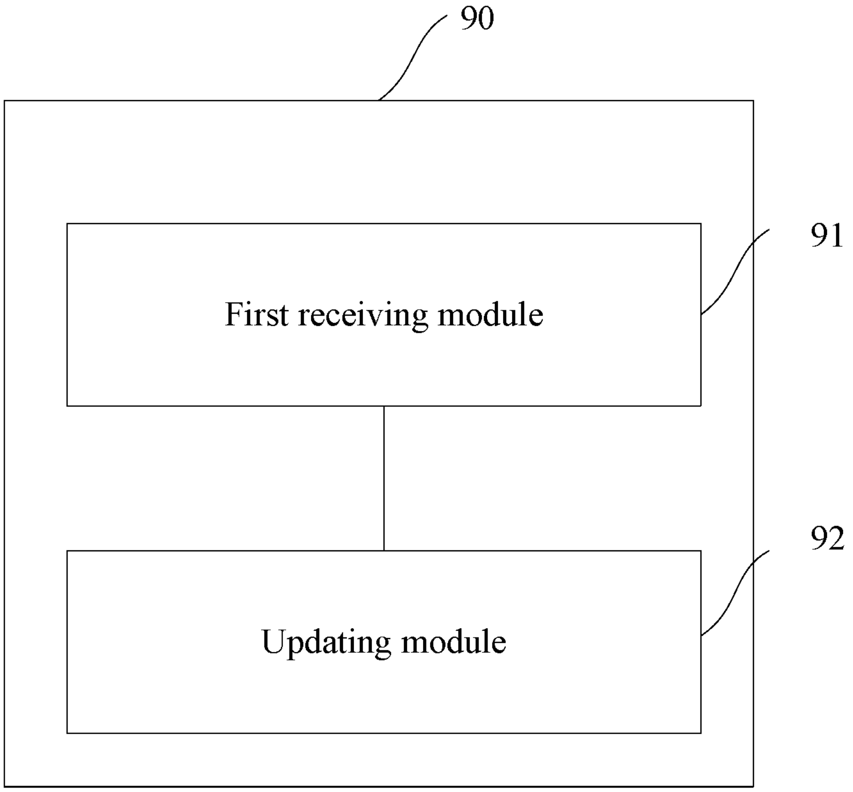
FIG. 9 is a schematic structural diagram of a terminal protocol function update apparatus according to an embodiment of this application.

Refer to FIG. 9. This embodiment of this application also provides a terminal protocol function update apparatus 90, which includes:

- a first receiving module 91, configured to receive protocol function configuration information of a first service configured by a network side device; and
- an update module 92, configured to update a protocol function according to the protocol function configuration information.

In the embodiments of this application, the protocol function required on the terminal side can be dynamically updated for a certain service scenario through the air interface based on the mobile communication protocol function, so that the terminal side does not need to support the protocol function for all potential service scenarios, reducing the complexity of the terminal.

Optionally, the protocol function configuration information includes at least one of the following:

- physical layer protocol function configuration information;
- radio access network high-layer protocol function configuration information;
- NAS protocol function configuration information; and
- application layer protocol function configuration information.

Optionally, the protocol function configuration information is carried by at least one of the following messages:

- a MAC CE;
- an RRC message;
- a NAS message;
- a management and orchestration message; and
- user plane data.

Optionally, the protocol function configuration information is carried by one or more messages.

Optionally, the apparatus further includes:

- a regrouping module, configured to: in a case that the protocol function configuration information is carried by an RRC message or a NAS message, and the received protocol function configuration information includes multiple segments, regroup the multiple segments.

Optionally, the apparatus further includes:

- a first sending module, configured to send a first protocol function update request to the network side device, where the first protocol function update request is used to request the protocol function configuration information of the first service from the network side device.

Optionally, the first protocol function update request includes at least one of the following:

- a protocol function range supported by the terminal, where the protocol function range includes at least one of the following: a physical layer protocol function, a high-layer user plane protocol function, a high-layer control plane protocol function, a NAS protocol function, and an application layer protocol function;
- information of a target service supported by the protocol function configuration information requested by the terminal, where the information of the target services includes at least one of the following: a service type and a service time; and
- a suggestion or a requirement of the terminal for protocol function configuration, where the suggestion or the requirement includes at least one of the following: a physical layer protocol function configuration suggestion or requirement, a radio access network high-layer protocol function suggestion or requirement, a NAS protocol function suggestion or requirement, and an application layer protocol function suggestion or requirement.

Optionally, the apparatus further includes:

- a second sending module, configured to send terminal capability reporting information to the network side device, where the terminal capability reporting information includes a protocol function range supported by the terminal for update by the network side device or includes that the terminal does not support protocol function update by the network side device, and the protocol function range includes at least one of the following: a physical layer protocol function, a high-layer user plane protocol function, a high-layer control plane protocol function, a NAS protocol function, and an application layer protocol function.

Optionally, the apparatus further includes:

- a second receiving module, configured to receive a second protocol function update request sent by the network side device, where the second protocol function update request is used to request the terminal to update the protocol function configuration information of the first service; and
- a third sending module, configured to send a protocol function update reception confirmation message or a protocol function update reception rejection message to the network side device.

Optionally, the protocol function configuration information is one of the following:

a complete protocol function file;

a partial protocol function file; and an incremental protocol function file based on a historically downloaded protocol function.

Optionally, the complete protocol function file includes: a protocol function description and a protocol function file, and the protocol function description includes at least one of the following: a protocol function indication, a protocol interface indication, an updated protocol function file length indication, and a protocol function identifier.

Optionally, the partial protocol function file includes: a protocol function description and a protocol function file, and the protocol function description includes at least one of the following: a reference template or a reference function of the protocol function, a protocol function indication, a protocol interface indication, an updated protocol function file length indication, and a protocol function identifier.

Optionally, the incremental protocol function file based on a historically downloaded protocol function includes: a protocol function description and a protocol function file, and the protocol function description includes at least one of the following: a reference template or a reference function of the protocol function, insertion position information of the incremental protocol function, an updated protocol function file length indication, and a protocol function identifier.

Optionally, the apparatus further includes:

a fourth sending module, configured to send a protocol function update completion message to the network side device.

Optionally, the apparatus further includes:

a deletion module, configured to: in a case that the terminal only supports the updated protocol function, delete an old protocol function according to a deletion instruction sent by the network side device.

Optionally, the apparatus further includes:

a third receiving module, configured to: in a case that the terminal supports both the updated protocol function and the old protocol function, receive a usage rule configuration of the updated protocol function sent by the network side device.

Optionally, the apparatus further includes:

an execution module, configured to: in a case that the terminal fails in updating the protocol function, perform at least one of the following:

sending a protocol function update failure message to the network side device; and removing the updated protocol function.

Optionally, the apparatus further includes:

a fifth sending module, configured to send information of the first service based on the updated protocol function.

Optionally, content of the protocol function update includes at least one of the following: functional function update, software update, virtual machine update, container update, and microservice application update.

The terminal protocol function update apparatus in the embodiment of this application may be a device, a device with an operating system or an electronic device, or may be a component, an integrated circuit, or a chip in a terminal. The apparatus or electronic device may be a mobile terminal, or a non-mobile terminal. For example, the mobile terminal may include but is not limited to the types of the foregoing listed terminal 11, and the non-mobile terminal may be a server, a network attached storage (NAS), a personal computer (PC), a television (TV), an automated teller machine, or a self-service machine. This is not specifically limited in the embodiments of this application.

The terminal protocol function update apparatus according to an embodiments of the present disclosure can implement the processes in the method embodiments in FIG. 2, and achieve the same technical effect. To avoid repetition, details are not described herein again.

Figure 10:
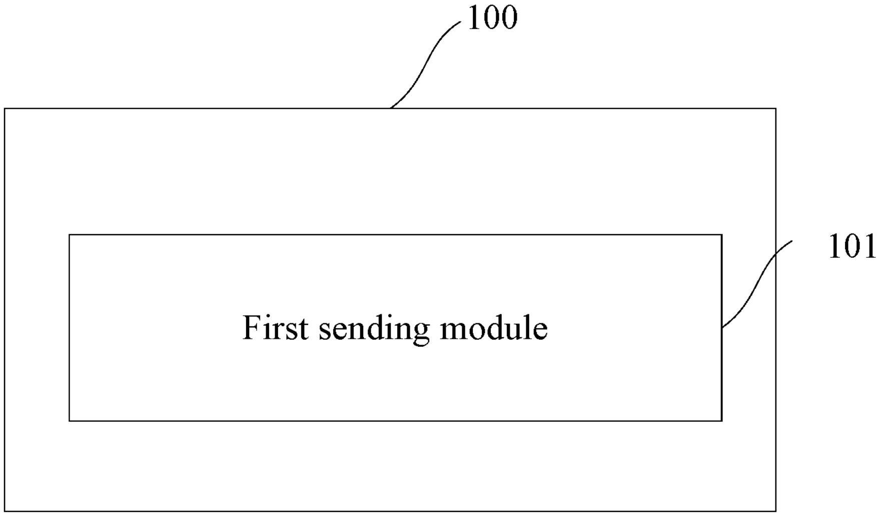
FIG. 10 is a schematic structural diagram of a terminal protocol function update apparatus according to another embodiment of this application.

Refer to FIG. 10. This embodiment of this application also provides a terminal protocol function update apparatus 100, which includes:

a first sending module 101, configured to send configured protocol function configuration information of a first service to a terminal.

Optionally, the protocol function configuration information includes at least one of the following:

physical layer protocol function configuration information;

radio access network high-layer protocol function configuration information;

NAS protocol function configuration information; and application layer protocol function configuration information.

Optionally, the protocol function configuration information is sent through at least one of the following messages:

a MAC CE;

an RRC message;

a NAS message;

a management and orchestration message; and user plane data.

Optionally, the first sending module 101 is configured to send the configured protocol function configuration information of the first service to the terminal through one or more messages.

Optionally, the apparatus further includes:

a segmentation module, configured to: in a case that the protocol function configuration information is sent through an RRC message or a NAS message, and a length of the protocol function configuration information exceeds a preset threshold, divide the protocol function configuration information into multiple segments.

Optionally, the apparatus further includes:

a first receiving module, configured to receive a first protocol function update request sent by the terminal, where the first protocol function update request is used to request the protocol function configuration information of the first service from the network side device.

Optionally, the first protocol function update request includes at least one of the following:

a protocol function range supported by the terminal, where the protocol function range includes at least one of the following: a physical layer protocol function, a high-layer user plane protocol function, a high-layer control plane protocol function, a NAS protocol function, and an application layer protocol function;

information of a target service supported by the protocol function configuration information requested by the terminal, where the information of the target services includes at least one of the following: a service type and a service time; and a suggestion or a requirement of the terminal for protocol function configuration, where the suggestion or the requirement includes at least one of the following: a physical layer protocol function configuration suggestion or requirement, a radio access network high-layer protocol function suggestion or requirement, a NAS protocol function suggestion or requirement, and an application layer protocol function suggestion or requirement.

Optionally, the apparatus further includes:

a second receiving module, configured to receive terminal capability reporting information sent by the terminal, where the terminal capability reporting information includes a protocol function range supported by the terminal for update by the network side device or includes that the terminal does not support protocol function update by the network side device, and the protocol function range includes at least one of the following: a physical layer protocol function, a high-layer user plane protocol function, a high-layer control plane protocol function, a NAS protocol function, and an application layer protocol function; and a configuration module, configured to configure the protocol function configuration information according to the terminal capability reporting information.

Optionally, the apparatus further includes:

a second sending module, configured to send a second protocol function update request to the terminal, where the second protocol function update request is used to request the terminal to update the protocol function configuration information of the first service; and a third receiving module, configured to receive a protocol function update reception confirmation message sent by the terminal.

Optionally, the protocol function configuration information is one of the following:

a complete protocol function file;

a partial protocol function file; and an incremental protocol function file based on a historically downloaded protocol function.

Optionally, the complete protocol function file includes: a protocol function description and a protocol function file, and the protocol function description includes at least one of the following: a protocol function indication, a protocol interface indication, an updated protocol function file length indication, and a protocol function identifier.

Optionally, the partial protocol function file includes: a protocol function description and a protocol function file, and the protocol function description includes at least one of the following: a reference template or a reference function of the protocol function, a protocol function indication, a protocol interface indication, an updated protocol function file length indication, and a protocol function identifier.

Optionally, the incremental protocol function file based on a historically downloaded protocol function includes: a protocol function description and a protocol function file, and the protocol function description includes at least one of the following: a reference template or a reference function of the protocol function, insertion position information of the incremental protocol function, an updated protocol function file length indication, and a protocol function identifier.

Optionally, the apparatus further includes:

a fourth receiving module, configured to receive a protocol function update completion message or a protocol function update failure message sent by the terminal.

Optionally, the apparatus further includes:

a third sending module, configured to: in a case that the terminal supports both the updated protocol function and the old protocol function, send a usage rule configuration of the updated protocol function to the terminal.

Optionally, the apparatus further includes:

a fifth receiving module, configured to receive information of the first service sent by the terminal based on the updated protocol function.

Optionally, content of the protocol function update includes at least one of the following: functional function update, software update, virtual machine update, container update, and microservice application update.

The terminal protocol function update apparatus according to an embodiments of the present disclosure can implement the processes in the method embodiments in FIG. 3, and achieve the same technical effect. To avoid repetition, details are not described herein again.

Figure 11:
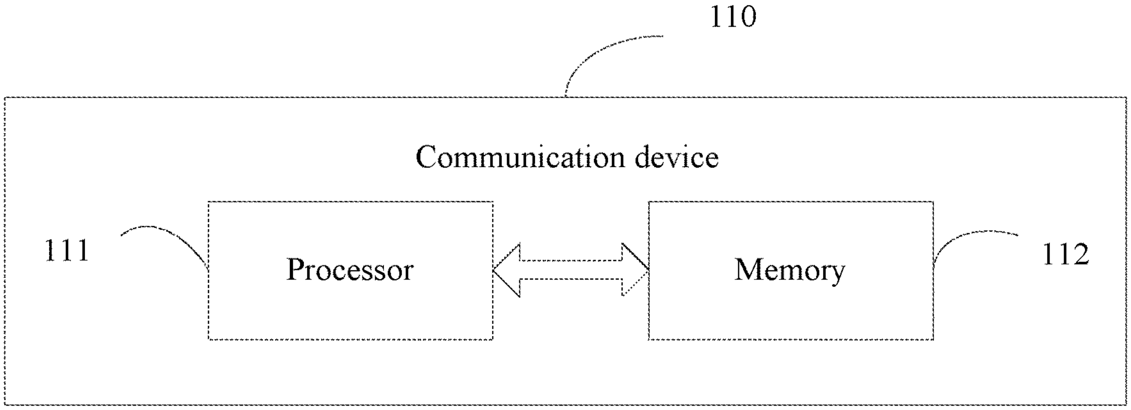
FIG. 11 is a schematic diagram of a structure of a communications device according to an embodiment of this application.

As shown in FIG. 11, an embodiment of this application further provides a communication device 110, including a processor 111, a memory 112, and a program or an instruction stored in the memory 112 and executable on the processor 111. For example, when the communication device 110 is a terminal, when the program or instruction is executed by the processor 111, each process of the embodiment of the foregoing terminal protocol function update method performed by the terminal is performed, and the same technical effect can be achieved. When the communication device 110 is a network side device, when the programs or instructions are executed by the processor 111, each process of the embodiment of the foregoing terminal protocol function update method performed by the network side device is performed, and the same technical effect can be achieved. To avoid repetition, details are not repeated herein.

Figure 12:
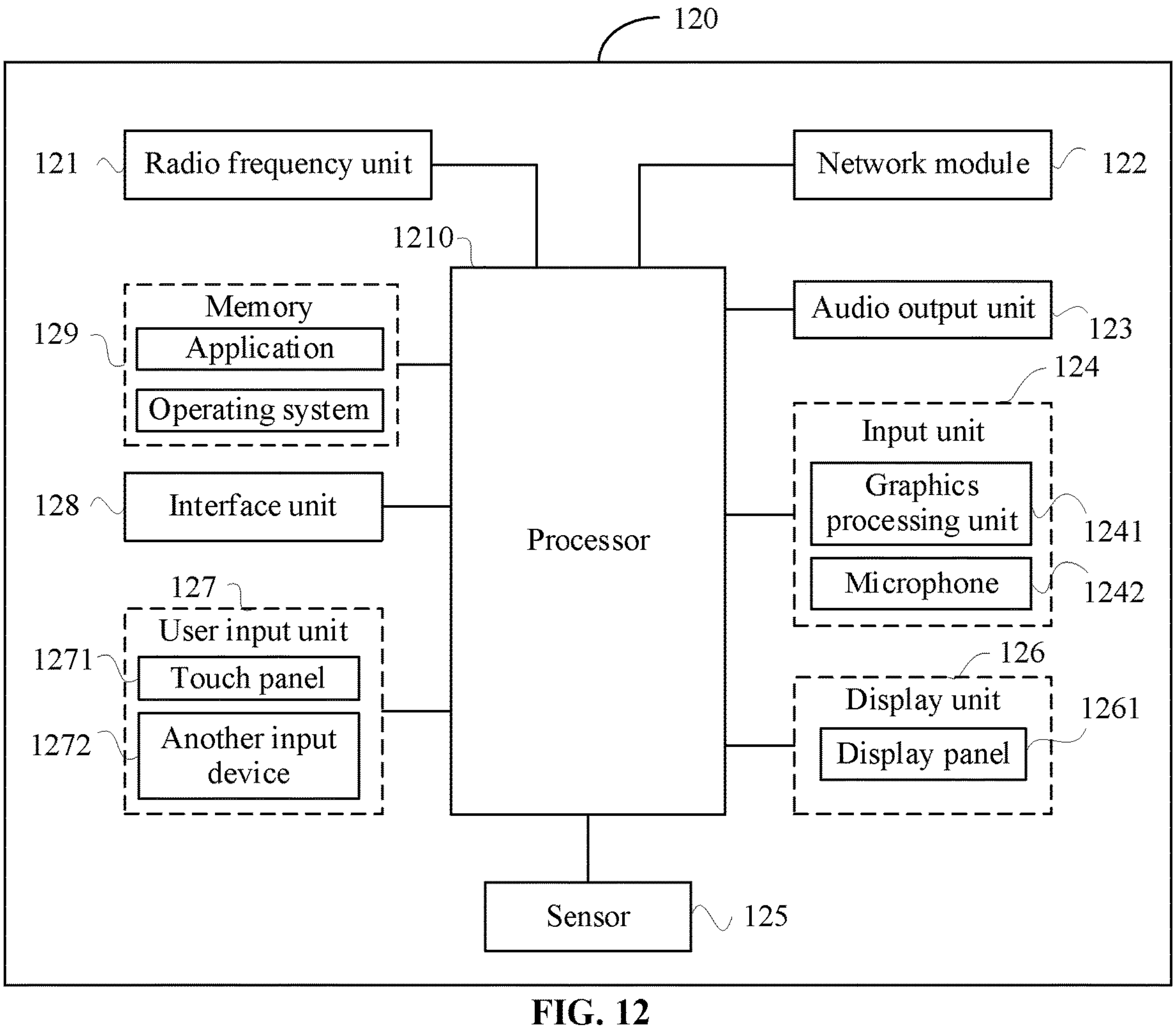
FIG. 12 is a schematic diagram of a hardware structure of a terminal according to an embodiment of this application.

Embodiments of this application also provide a terminal, including a processor and a communication interface, where the communication interface is configured to receive protocol function configuration information of a first service configured by a network side device; and the processor is configured to update a protocol function according to the protocol function configuration information. This terminal embodiment corresponds to the foregoing method embodiment on the terminal side. Each implementation process and implementation of the foregoing method embodiment may be applicable to this terminal embodiment, and a same technical effect can be achieved. Specifically, FIG. 12 is a schematic diagram of a hardware structure of a terminal according to an embodiment of this application.

A terminal 120 includes but is not limited to at least a part of components such as a radio frequency unit 121, a network module 122, an audio output unit 123, an input unit 124, a sensor 125, a display unit 126, a user input unit 127, an interface unit 128, a memory 129, and a processor 112.

A person skilled in the art can understand that the terminal 120 may further include a power supply (such as a battery) that supplies power to each component. The power supply may be logically connected to the processor 112 by using a power supply management system, to implement functions such as charging and discharging management, and power consumption management by using the power supply management system. The terminal structure shown in FIG. 12 constitutes no limitation on the terminal, and the terminal may include more or fewer components than those shown in the figure, or combine some components, or have different component arrangements. Details are not described herein.

It should be understood that in this embodiment of this application, the input unit 124 may include a graphics processing unit (GPU) 1241 and a microphone 1242. The graphics processing unit 1241 processes image data of a static picture or a video obtained by an image capture apparatus (for example, a camera) in a video capture mode or an image capture mode. The display unit 126 may include a display panel 1261. Optionally, the display panel 1261 may be configured in a form such as a liquid crystal display or an organic light-emitting diode. The user input unit 127 includes a touch panel 1271 and another input device 1272. The touch panel 1271 is also referred to as a touchscreen. The touch panel 1271 may include two parts: a touch detection apparatus and a touch controller. The another input device 1272 may include but is not limited to a physical keyboard, a functional button (such as a volume control button or a power on/off button), a trackball, a mouse, and a joystick. Details are not described herein.

In this embodiment of this application, the radio frequency unit 121 receives downlink data from a network side device and then sends the downlink data to the processor 112 for processing; and sends uplink data to the network side device. Usually, the radio frequency unit 121 includes but is not limited to an antenna, at least one amplifier, a transceiver, a coupler, a low noise amplifier, a duplexer, and the like.

The memory 129 may be configured to store a software program or an instruction and various data. The memory 129 may mainly include a program or instruction storage area and a data storage area. The program or instruction storage area may store an operating system, and an application or an instruction required by at least one function (for example, a sound playing function or an image playing function). In addition, the memory 129 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-volatile solid-state storage device.

The processor 112 may include one or more processing units. Optionally, an application processor and a modem processor may be integrated into the processor 112. The application processor mainly processes an operating system, a user interface, an application, an instruction, or the like. The modem processor mainly processes wireless communication, for example, a baseband processor. It can be understood that, alternatively, the modem processor may not be integrated into the processor 112.

The radio frequency unit 121 is configured to receive the protocol function configuration information of the first service configured by the network side device.

The processor 112 is configured to update a protocol function according to the protocol function configuration information.

In the embodiments of this application, the protocol function required on the terminal side can be dynamically updated for a certain service scenario through the air interface based on the mobile communication protocol function, so that the terminal side does not need to support the protocol function for all potential service scenarios, reducing the complexity of the terminal.

Optionally, the radio frequency unit 121 is configured to receive the protocol function configuration information of the first service configured by the network side device.

The processor 112 is configured to update a protocol function according to the protocol function configuration information.

Optionally, the protocol function configuration information includes at least one of the following:

physical layer protocol function configuration information;

radio access network high-layer protocol function configuration information;

NAS protocol function configuration information; and application layer protocol function configuration information.

Optionally, the protocol function configuration information is carried by at least one of the following messages:

a MAC CE;

an RRC message;

a NAS message;

a management and orchestration message; and user plane data.

Optionally, the protocol function configuration information is carried by one or more messages.

Optionally, the processor 112 is also configured to: in a case that the protocol function configuration information is carried by an RRC message or a NAS message, and the received protocol function configuration information includes multiple segments, regroup the multiple segments.

Optionally, the radio frequency unit 121 is also configured to send a first protocol function update request to the network side device, where the first protocol function update request is used to request the protocol function configuration information of the first service from the network side device.

Optionally, the first protocol function update request includes at least one of the following:

a protocol function range supported by the terminal, where the protocol function range includes at least one of the following: a physical layer protocol function, a high-layer user plane protocol function, a high-layer control plane protocol function, a NAS protocol function, and an application layer protocol function;

information of a target service supported by the protocol function configuration information requested by the terminal, where the information of the target services includes at least one of the following: a service type and a service time; and a suggestion or a requirement of the terminal for protocol function configuration, where the suggestion or the requirement includes at least one of the following: a physical layer protocol function configuration suggestion or requirement, a radio access network high-layer protocol function suggestion or requirement, a NAS protocol function suggestion or requirement, and an application layer protocol function suggestion or requirement.

Optionally, the radio frequency unit 121 is also configured to send terminal capability reporting information to the network side device, where the terminal capability reporting information includes a protocol function range supported by the terminal for update by the network side device or includes that the terminal does not support protocol function update by the network side device, and the protocol function range includes at least one of the following: a physical layer protocol function, a high-layer user plane protocol function, a high-layer control plane protocol function, a NAS protocol function, and an application layer protocol function.

Optionally, the radio frequency unit 121 is also configured to receive a second protocol function update request sent by the network side device, where the second protocol function update request is used to request the terminal to update the protocol function configuration information of the first service; and send a protocol function update confirmation message or a protocol function update rejection message to the network side device.

Optionally, the protocol function configuration information is one of the following:

a complete protocol function file;

a partial protocol function file; and an incremental protocol function file based on a historically downloaded protocol function.

Optionally, the complete protocol function file includes: a protocol function description and a protocol function file, and the protocol function description includes at least one of the following: a protocol function indication, a protocol interface indication, an updated protocol function file length indication, and a protocol function identifier.

Optionally, the partial protocol function file includes: a protocol function description and a protocol function file, and the protocol function description includes at least one of the following: a reference template or a reference function of the protocol function, a protocol function indication, a protocol interface indication, an updated protocol function file length indication, and a protocol function identifier.

Optionally, the incremental protocol function file based on a historically downloaded protocol function includes: a protocol function description and a protocol function file, and the protocol function description includes at least one of the following: a reference template or a reference function of the protocol function, insertion position information of the incremental protocol function, an updated protocol function file length indication, and a protocol function identifier.

Optionally, the radio frequency unit 121 is also configured to send a protocol function update completion message to the network side device.

Optionally, the processor 1210 is also configured to: in a case that the terminal only supports the updated protocol function, delete an old protocol function according to a deletion instruction sent by the network side device.

Optionally, the radio frequency unit 121 is also configured to: in a case that the terminal supports both the updated protocol function and the old protocol function, receive a usage rule configuration of the updated protocol function sent by the network side device.

Optionally, the radio frequency unit 121 is also configured to: in a case that the terminal fails to update the protocol function, send a protocol function update failure message to the network side device.

Optionally, the processor 1210 is also configured to: in a case that the terminal fails to update the protocol function, delete the updated protocol function.

Optionally, the radio frequency unit 121 is also configured to send information of the first service based on the updated protocol function.

Optionally, content of the protocol function update includes at least one of the following: functional function update, software update, virtual machine update, container update, and microservice application update.

An embodiment of this application also provides a network side device, including a processor and a communication interface. The communication interface is configured to send configured protocol function configuration information of a first service to a terminal. This network side device embodiment corresponds to the foregoing method embodiment on the network side device. Each implementation process and implementation of the foregoing method embodiment may be applicable to this network side device embodiment, and a same technical effect can be achieved.

Figure 13:
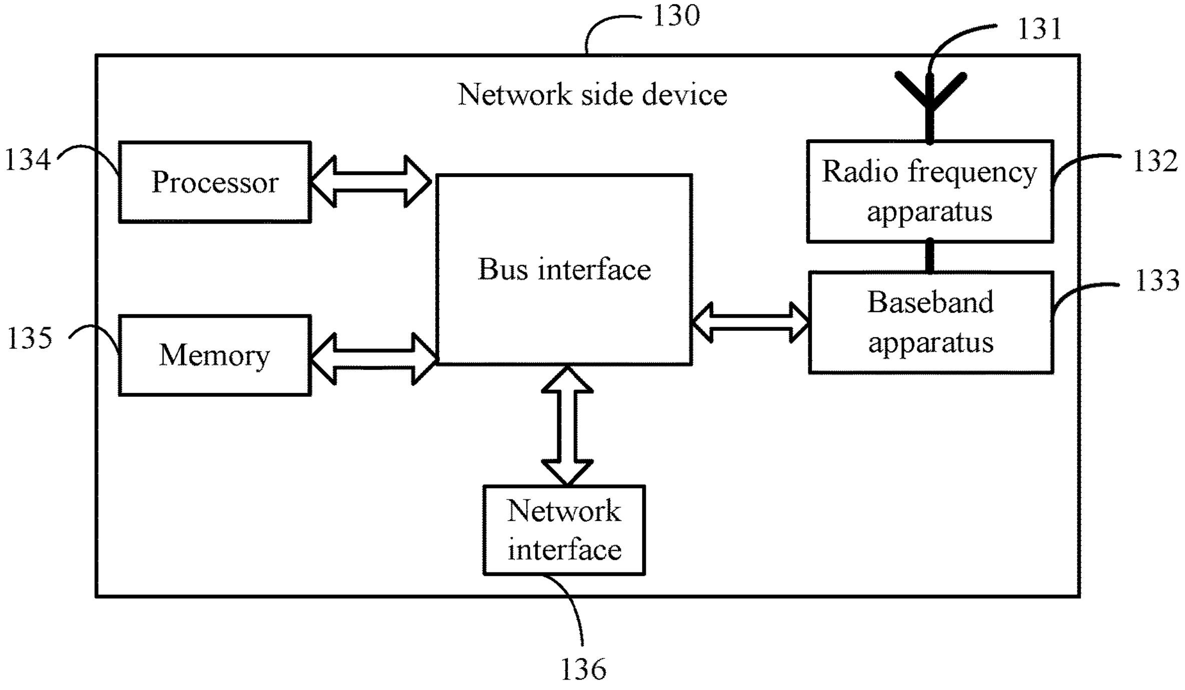
FIG. 13 is a schematic diagram of a hardware structure of a network side device according to an embodiment of this application.

Specifically, an embodiment of this application further provides a network side device. As shown in FIG. 13, a network device 1300 includes an antenna 131, a radio frequency apparatus 132, and a baseband apparatus 133. The antenna 131 is connected to the radio frequency apparatus 132. In an uplink direction, the radio frequency apparatus 132 receives information by using the antenna 131, and sends the received information to the baseband apparatus 133 for processing. In a downlink direction, the baseband apparatus 133 processes information that needs to be sent, and sends processed information to the radio frequency apparatus 132. The radio frequency apparatus 132 processes the received information, and sends processed information by using the antenna 131.

The frequency band processing apparatus may be located in the baseband apparatus 133. The method performed by the network side device in the foregoing embodiment may be implemented in the baseband apparatus 133. The baseband apparatus 133 includes a processor 134 and a memory 135.

The baseband apparatus 133 may include, for example, at least one baseband board, where a plurality of chips are disposed on the baseband board. As shown in FIG. 13, one chip is, for example, the processor 134, which is connected to the memory 135, so as to invoke a program in the memory 135 to perform operations of the network device shown in the foregoing method embodiment.

The baseband apparatus 133 may further include a network interface 136, configured to exchange information with the radio frequency apparatus 132. For example, the interface is a common public radio interface (CPRI for short).

Specifically, the network side device in this embodiment of the present invention further includes an instruction or a program that is stored in the memory 135 and that can be run on the processor 134. The processor 134 invokes the instruction or the program in the memory 135 to perform the method performed by the modules shown in FIG. 10, and a same technical effect is achieved. To avoid repetition, details are not described herein again.

An embodiment of this application further provides a readable storage medium. The readable storage medium stores a program or an instruction, and when the program or the instruction is executed by a processor, the various processes of embodiments of the foregoing terminal protocol function update method is performed and the same technical effects can be achieved. To avoid repetition, details are not described herein again.

The processor is a processor in the terminal in the foregoing embodiment. The readable storage medium includes a computer-readable storage medium, such as a computer read-only memory (ROM), a random access memory (RAM), a magnetic disk, or an optical disc.

An embodiment of this application further provides a chip, the chip includes a processor and a communication interface, the communication interface is coupled to the processor, and the processor is configured to run programs or instructions to implement each process of the embodiment of the foregoing terminal protocol function update method and the same technical effects can be achieved. To avoid repetition, details are not described herein again.

It should be understood that the chip mentioned in this embodiment of this application may also be referred to as a system-level chip, a system chip, a chip system, or an on-chip system chip.

Embodiments of this application also provide a computer program product, which is stored in a readable storage medium. The computer program product is executed by at least one processor to implement each process in the above embodiments of the terminal protocol function update method, and the same technical effect can be achieved. To avoid duplication, it will not be described again here.

It should be noted that, in this specification, the term “include”, “comprise”, or any other variant thereof is intended to cover a non-exclusive inclusion, so that a process, a method, an article, or an apparatus that includes a list of elements not only includes those elements but al so includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially, or the part contributing to the prior art may be implemented in a form of a computer software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A terminal protocol function update method, comprising:

receiving, by a terminal, protocol function configuration information of a first service configured by a network side device; and updating, by the terminal, a protocol function according to the protocol function configuration information, wherein the protocol function configuration information is one of the following: a complete protocol function file; a partial protocol function file; and an incremental protocol function file based on a historically downloaded protocol function, and wherein the complete protocol function file comprises: a protocol function description and a protocol function file, and the protocol function description comprises at least one of the following: a protocol function indication, a protocol interface indication, an updated protocol function file length indication, and a protocol function identifier; or, wherein the partial protocol function file comprises: a protocol function description and a protocol function file, and the protocol function description comprises at least one of the following: a reference template or a reference function of the protocol function, a protocol function indication, a protocol interface indication, an updated protocol function file length indication, and a protocol function identifier; or, wherein the incremental protocol function file based on a historically downloaded protocol function comprises: a protocol function description and a protocol function file, and the protocol function description comprises at least one of the following: a reference template or a reference function of the protocol function, insertion position information of the incremental protocol function, an updated protocol function file length indication, and a protocol function identifier.

2. The method according to claim 1, wherein the protocol function configuration information comprises at least one of the following:

physical layer protocol function configuration information;

radio access network high-layer protocol function configuration information;

non-access stratum (NAS) protocol function configuration information; and application layer protocol function configuration information.

3. The method according to claim 1, wherein the protocol function configuration information is carried by at least one of the following messages:

a media access control control element (MAC CE);

a radio resource control (RRC) message;

a non-access stratum (NAS) message;

a management and orchestration message; and user plane data;

wherein the protocol function configuration information is carried by one or more messages.

4. The method according to claim 3, after the receiving, by the terminal, the protocol function configuration information of the first service configured by the network side device, further comprising:

in a case that the protocol function configuration information is carried by an RRC message or a NAS message, and the received protocol function configuration information comprises multiple segments, regrouping, by the terminal, the multiple segments.

5. The method according to claim 1, before the receiving, by the terminal, the protocol function configuration information of the first service configured by a network side device, further comprising:

sending, by the terminal, a first protocol function update request to the network side device, wherein the first protocol function update request is used to request the protocol function configuration information of the first service from the network side device;

wherein the first protocol function update request comprises at least one of the following:

a protocol function range supported by the terminal, wherein the protocol function range comprises at least one of the following: a physical layer protocol function, a high-layer user plane protocol function, a high-layer control plane protocol function, a non-access stratum (NAS) protocol function, and an application layer protocol function;

information of a target service supported by the protocol function configuration information requested by the terminal, wherein the information of the target services comprises at least one of the following: a service type and a service time; and a suggestion or a requirement of the terminal for protocol function configuration, wherein the suggestion or the requirement comprises at least one of the following: a physical layer protocol function configuration suggestion or requirement, a radio access network high-layer protocol function suggestion or requirement, a NAS protocol function suggestion or requirement, and an application layer protocol function suggestion or requirement.

6. The method according to claim 1, before the receiving, by the terminal, the protocol function configuration information of the first service configured by the network side device, further comprising:

sending, by the terminal, terminal capability reporting information to the network side device, wherein the terminal capability reporting information comprises a protocol function range supported by the terminal for update by the network side device or comprises that the terminal does not support protocol function update by the network side device, and the protocol function range comprises at least one of the following: a physical layer protocol function, a high-layer user plane protocol function, a high-layer control plane protocol function, a non-access stratum (NAS) protocol function, and an application layer protocol function; or, before the receiving, by the terminal, the protocol function configuration information of the first service configured by the network side device, further comprising:

receiving, by the terminal, a second protocol function update request sent by the network side device, wherein the second protocol function update request is used to request the terminal to update the protocol function configuration information of the first service; and sending, by the terminal, a protocol function update reception confirmation message or a protocol function update reception rejection message to the network side device.

7. The method according to claim 1, after the updating, by the terminal, the protocol function according to the protocol function configuration information, further comprising:

sending, by the terminal, a protocol function update completion message to the network side device; or, after the updating, by the terminal, the protocol function according to the protocol function configuration information, further comprising:

in a case that the terminal only supports the updated protocol function, deleting, by the terminal, an old protocol function according to a deletion instruction sent by the network side device; or, after the updating, by the terminal, the protocol function according to the protocol function configuration information, further comprising:

in a case that the terminal supports both the updated protocol function and the old protocol function, receiving, by the terminal, a usage rule configuration of the updated protocol function sent by the network side device; or, after the updating, by the terminal, the protocol function according to the protocol function configuration information, further comprising:

in a case that the terminal fails in updating the protocol function, performing at least one of the following:

sending a protocol function update failure message to the network side device; and removing the updated protocol function; or, after the updating, by the terminal, the protocol function according to the protocol function configuration information, further comprising:

sending, by the terminal, information of the first service based on the updated protocol function.

8. The method according to claim 1, wherein content of the protocol function update comprises at least one of the following: functional function update, software update, virtual machine update, container update, and microservice application update.

9. A terminal protocol function update method, comprising:

sending, by a network side device, configured protocol function configuration information of a first service to a terminal, wherein the protocol function configuration information is sent through at least one of the following messages: a media access control control element (MAC CE); a radio resource control (RRC) message; a non-access stratum (NAS) message; a management and orchestration message; and user plane data, and wherein the network side device sends the configured protocol function configuration information of the first service to the terminal through one or more messages, and wherein before the sending, by a network side device, configured protocol function configuration information of the first service to the terminal, further comprising:

in a case that the protocol function configuration information is sent through an RRC message or a NAS message, and a length of the protocol function configuration information exceeds a preset threshold, dividing the protocol function configuration information into multiple segments.

10. The method according to claim 9, wherein the protocol function configuration information comprises at least one of the following:

physical layer protocol function configuration information;

radio access network high-layer protocol function configuration information;

NAS protocol function configuration information; and application layer protocol function configuration information.

11. The method according to claim 9, before the sending, by the network side device, the configured protocol function configuration information of the first service to the terminal, further comprising:

receiving, by the network side device, a first protocol function update request sent by the terminal, wherein the first protocol function update request is used to request the protocol function configuration information of the first service from the network side device;

wherein the first protocol function update request comprises at least one of the following:

a protocol function range supported by the terminal, wherein the protocol function range comprises at least one of the following: a physical layer protocol function, a high-layer user plane protocol function, a high-layer control plane protocol function, a NAS protocol function, and an application layer protocol function;

information of a target service supported by the protocol function configuration information requested by the terminal, wherein the information of the target services comprises at least one of the following: a service type and a service time; and a suggestion or a requirement of the terminal for protocol function configuration, wherein the suggestion or the requirement comprises at least one of the following: a physical layer protocol function configuration suggestion or requirement, a radio access network high-layer protocol function suggestion or requirement, a NAS protocol function suggestion or requirement, and an application layer protocol function suggestion or requirement.

12. The method according to claim 9, before the sending, by a network side device, configured protocol function configuration information of a first service to a terminal, further comprising: receiving, by the network side device, terminal capability reporting information sent by the terminal, wherein the terminal capability reporting information comprises a protocol function range supported by the terminal for update by the network side device or comprises that the terminal does not support protocol function update by the network side device, and the protocol function range comprises at least one of the following: a physical layer protocol function, a high-layer user plane protocol function, a high-layer control plane protocol function, a NAS protocol function, and an application layer protocol function; and configuring, by the network side device, the protocol function configuration information according to the terminal capability reporting information; or, before the sending, by a network side device, configured protocol function configuration information of a first service to a terminal, further comprising: sending, by the network side device, a second protocol function update request to the terminal, wherein the second protocol function update request is used to request the terminal to update the protocol function configuration information of the first service; and receiving, by the network side device, a protocol function update reception confirmation message sent by the terminal.

13. The method according to claim 9, wherein the protocol function configuration information is one of the following:

a complete protocol function file;

a partial protocol function file; and an incremental protocol function file based on a historically downloaded protocol function.

14. The method according to claim 9, after the sending, by the network side device, the configured protocol function configuration information of the first service to the terminal, further comprising: receiving, by the network side device, a protocol function update completion message or protocol function update failure message sent by the terminal; or, after the sending, by the network side device, the configured protocol function configuration information of the first service to the terminal, further comprising:

in a case that the terminal supports both the updated protocol function and an old protocol function, sending, by the network side device, a usage rule configuration of the updated protocol function to the terminal; or, after the sending, by a network side device, configured protocol function configuration information of a first service to a terminal, further comprising: receiving, by the network side device, information of the first service sent by the terminal based on the updated protocol function.

15. A terminal, comprising a processor, a memory, and a program or an instruction stored in the memory and executable on the processor, wherein the program or instruction, when executed by the processor, causes the processor to perform:

receiving protocol function configuration information of a first service configured by a network side device; and updating a protocol function according to the protocol function configuration information, wherein the protocol function configuration information is one of the following: a complete protocol function file; a partial protocol function file; and an incremental protocol function file based on a historically downloaded protocol function, and wherein the complete protocol function file comprises: a protocol function description and a protocol function file, and the protocol function description comprises at least one of the following: a protocol function indication, a protocol interface indication, an updated protocol function file length indication, and a protocol function identifier; or, wherein the partial protocol function file comprises: a protocol function description and a protocol function file, and the protocol function description comprises at least one of the following: a reference template or a reference function of the protocol function, a protocol function indication, a protocol interface indication, an updated protocol function file length indication, and a protocol function identifier; or, wherein the incremental protocol function file based on a historically downloaded protocol function comprises: a protocol function description and a protocol function file, and the protocol function description comprises at least one of the following: a reference template or a reference function of the protocol function, insertion position information of the incremental protocol function, an updated protocol function file length indication, and a protocol function identifier.

16. A network side device, comprising a processor, a memory, and a program or instruction stored in the memory and executable on the processor, wherein when the program or instruction is executed by the processor, steps of the terminal protocol function update method according to claim 9 are implemented.

* * * * *